United States Patent
Baba

(10) Patent No.: US 10,293,773 B2
(45) Date of Patent: May 21, 2019

(54) DRIVE ASSIST APPARATUS

(71) Applicant: DENSO CORPORATION, Kariya, Aichi-pref. (JP)

(72) Inventor: Takahiro Baba, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 54 days.

(21) Appl. No.: 15/514,946

(22) PCT Filed: Sep. 30, 2015

(86) PCT No.: PCT/JP2015/077668
§ 371 (c)(1),
(2) Date: Mar. 28, 2017

(87) PCT Pub. No.: WO2016/052586
PCT Pub. Date: Apr. 7, 2016

(65) Prior Publication Data
US 2017/0217395 A1   Aug. 3, 2017

(30) Foreign Application Priority Data

Sep. 30, 2014 (JP) .................................. 2014-199903

(51) Int. Cl.
*B60W 30/08* (2012.01)
*B60R 21/0134* (2006.01)
(Continued)

(52) U.S. Cl.
CPC ...... *B60R 21/0134* (2013.01); *B60R 21/0132* (2013.01); *B60W 30/08* (2013.01);
(Continued)

(58) Field of Classification Search
CPC ............ B60R 21/0134; B60R 21/0132; B60R 2021/01322; B60W 30/08–30/0956;
(Continued)

(56) References Cited

U.S. PATENT DOCUMENTS

2011/0187515 A1   8/2011   Saito et al.

FOREIGN PATENT DOCUMENTS

| JP | 2004-136788 | 5/2004 |
| JP | 2004-136788 A | 5/2004 |

(Continued)

*Primary Examiner* — Genna M Mott
(74) *Attorney, Agent, or Firm* — Knobbe, Martens, Olson & Bear, LLP

(57) ABSTRACT

The drive assist apparatus detects an object around an own vehicle, and detects a moving direction of the detected object when the detected object is relatively approaching the own vehicle. The drive assist apparatus predicts a movement prediction position to which the object will move, and executes drive assist upon the movement prediction position being a collision prediction position. The collision prediction position is a position where, if the object relatively moves to the movement prediction position, there is a possibility that the object will collide with the own vehicle. The drive assist includes at least one of a task of avoiding a collision between the object and the own vehicle, and a task of mitigating a damage due to the collision. The drive assist apparatus determines an execution timing of the drive assist as a function of the moving direction detected by the moving direction detection means, and the collision prediction position.

11 Claims, 7 Drawing Sheets

(51) Int. Cl.
  *B60W 30/085* (2012.01)
  *B60W 30/09* (2012.01)
  *B60W 30/095* (2012.01)
  *B60R 21/0132* (2006.01)
  *G08G 1/16* (2006.01)

(52) U.S. Cl.
  CPC .......... *B60W 30/085* (2013.01); *B60W 30/09* (2013.01); *B60W 30/095* (2013.01); *B60W 30/0953* (2013.01); *B60W 30/0956* (2013.01); *G08G 1/165* (2013.01); *G08G 1/166* (2013.01); *B60R 2021/01322* (2013.01); *B60W 2420/42* (2013.01); *B60W 2550/10* (2013.01)

(58) Field of Classification Search
  CPC ............. B60W 30/0953; B60W 30/09; B60W 30/095; B60W 30/085; B60W 2550/10; B60W 2420/42; G08G 1/165; G08G 1/166
  See application file for complete search history.

(56) References Cited

FOREIGN PATENT DOCUMENTS

| | | |
|---|---|---|
| JP | 2009-208560 | 9/2009 |
| JP | 2009-208560 A | 9/2009 |
| JP | 2010-102641 | 5/2010 |
| JP | 2011-113295 | 6/2011 |
| JP | 2011-113295 A | 6/2011 |

DRIVE ASSIST APPARATUS

TECHNICAL FIELD

The present invention relates to technologies for avoiding a collision between an own vehicle and objects or mitigating damage caused by a collision.

BACKGROUND ART

A known technology predicts a position where an own vehicle and an object, which is measured by sensors, such as a camera and/or a radar, around the own vehicle would collide with each other, thus performing drive assist of the own vehicle. The drive assist is to avoid a collision between the own vehicle and the object or mitigate damage due to a collision. Such a technology is disclosed in, for example, patent document 1.

A drive assist apparatus, which performs such drive assist, for example calculates a time to collision (TTC) with an object based on a relative speed of the object relative to a vehicle and a distance between the vehicle and the object. The TTC represents a time until which the vehicle would collide with the object. Then, the drive assist apparatus performs the drive assist when the TTC, which has been decreasing as the vehicle has been approaching the object, reaches one of activation thresholds previously determined for the respective types of drive assist including automatic braking and automatic steering.

CITATION LIST

Patent Document

[Patent Document 1] Japanese Patent Application Publication No. 2011-113295

SUMMARY OF INVENTION

Technical Problem

The predicted position, i.e. predicted collision position, where the vehicle and an object would collide with each other changes as the moving direction of the object relative to the vehicle changes. For this reason, if the predicted collision position of the object with respect to the vehicle changes, the probabilities of the object colliding with the vehicle at the respective predicted collision positions may differ from each other.

Unfortunately, the conventional technology including the technology of document 1 sets the activation thresholds independently of the moving direction of the object relative to the vehicle. This results in the same activation threshold being set for each of the different predicted collision positions where the corresponding collision possibilities are different from each other. This may result in the conventional technology having a difficulty in performing the drive assist at proper timings determined for the respective collision possibilities.

In order to solve such a problem, the present invention provides technologies, each of which is capable of performing drive assist at proper timings determined for respective collision possibilities between an object and a vehicle.

Means for Solving Problem

A drive assist apparatus according to an exemplary aspect of the present invention includes an object detection unit, a moving direction detection unit, a position prediction unit, a drive assist unit, and a determination unit.

The object detection unit detects an object around an own vehicle, and the moving direction detection unit detects a moving direction of the object detected by the object detection unit when the object is relatively approaching the own vehicle. The position prediction unit predicts a movement prediction position to which the object detected by the object detection unit will move.

The drive assist unit executes drive assist upon the movement prediction position predicted by the position prediction unit being a collision prediction position. The collision prediction position is a position where, if the object relatively moves to the movement prediction position, there is a probability that the object will collide with the own vehicle. The drive assist includes at least one of a task of avoiding a collision between the object and the own vehicle, and a task of mitigating a damage due to the collision.

The determination unit determines an execution timing of the drive assist by the drive assist unit as a function of the moving direction detected by the moving direction detection unit, and the collision prediction position.

This configuration enables the drive assist to be executed at a an execution timing determined based on the moving direction of the object, which is relatively approaching the own vehicle, and the collision probability at the collision prediction position between the object and the own vehicle; the execution timing is properly determined depending on the collision probability at the collision prediction position.

The probability of the object moving toward the far-side of the end of the own vehicle through the front side of the own vehicle in its travelling direction is likely to be higher than the probability of the object moving to the near-side of the end of the own vehicle from the position deviated from the front side of the own vehicle in its travelling direction.

Upon the collision prediction position being located at a front of the own vehicle in the travelling direction, the determination unit of the drive assist apparatus according to the exemplary aspect can be configured to make the execution timing at which the collision prediction position is located at the far-side of the front end of the own vehicle in the moving direction earlier than the execution timing at which the collision prediction position is located at the near-side of the front end of the own vehicle in the moving direction.

This configuration enables the execution timing of the drive assist at a collision prediction position where there is a higher probability of the object colliding with the own vehicle to be earlier than the execution timing of the drive assist at another collision prediction position where there is a lower probability of the object colliding with the own vehicle.

Note that bracketed reference numerals in the claims represent correspondence relationship with respect to specific means described in the following embodiments as an example, and therefore do not restrict the scope of the present invention.

DESCRIPTION OF EMBODIMENT

The following describes the embodiments of the present invention with reference to the accompanying drawings.

First Embodiment

Structure

Figure 1:
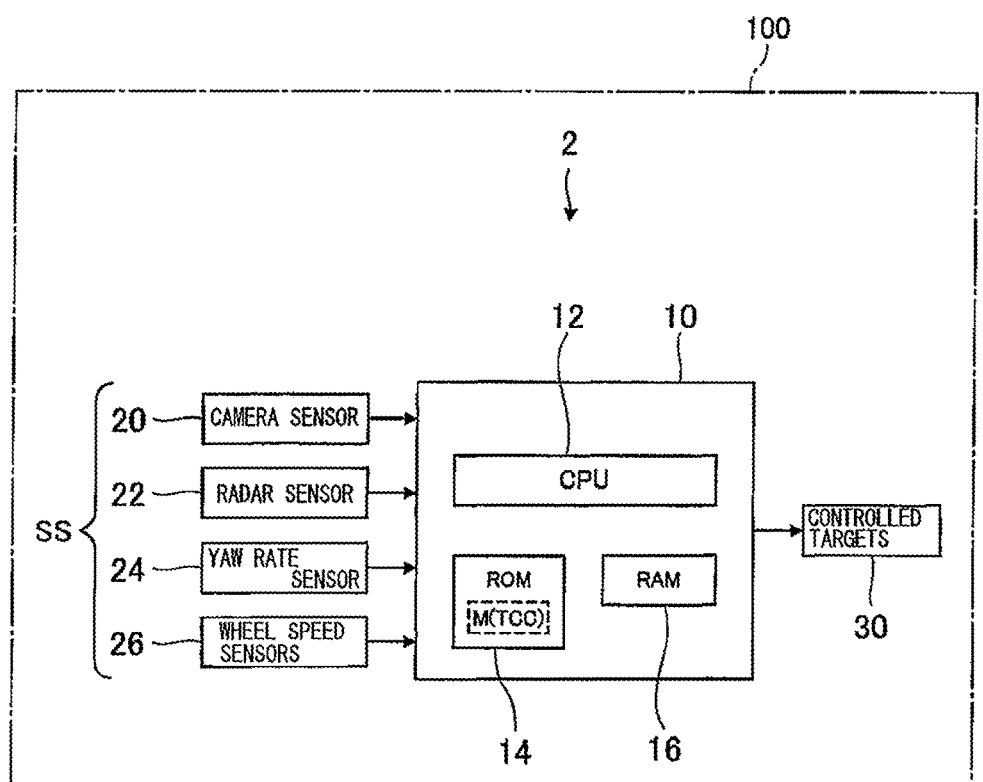
FIG. 1 is a block diagram illustrating a drive assist apparatus according to the first embodiment.

FIG. 1 illustrates a precrash safety system 2, which is an example of drive assist systems according to the first embodiment of the first embodiment of the present invention. The precrash safety system (PCS) 2, which is installed in a vehicle 100, performs a drive assist task to output warning and/or activate brakes if there is a probability, i.e. a possibility, that an object would collide with the own vehicle 100. The drive assist task is to avoid a collision between the own vehicle 100 and the object, or to mitigate damage due to a collision.

The PCS 2 includes a drive assist apparatus 10, various sensors SS, and controlled targets 30. The PCS 2 includes, for example, a camera sensor 20, a radar sensor 22, a yaw rate sensor 24, and wheel speed sensors 26 as the various sensors SS.

The camera sensor 20 is configured as a stereo camera capable of detecting the distances to objects. The camera sensor 20 repeatedly captures a predetermined range around the vehicle 100, for example, the front region of the vehicle 100, in a predetermined cycle. Then, the camera sensor 20 detects, based on the captured images, object information about an object included in the captured images; the object information includes, for example, the type, shape, distance relative to the own vehicle 100, and angle with respect to the own vehicle 100. The camera sensor 20 can classify the types of objects into vehicles, pedestrians, and the other objects.

The radar sensor 22 repeatedly scans a predetermined range in front of the vehicle 100 with directional electromagnetic waves, such as millimeter waves, and receives echoes, i.e. reflection waves, from an object based on the scanned electromagnetic waves, thus detecting object information of the object, which includes, for example, the distance of the object relative to the own vehicle 100 and the relative speed of the object relative to the own vehicle 100.

Specifically, each of the camera sensor 20 and the radar sensor 22 detects an object in front of the own vehicle 100 in a corresponding one of the predetermined cycles.

The yaw rate sensor 24 is designed as a known yaw rate sensor for measuring the yaw angular velocity, i.e. the raw rate, of the own vehicle 100. Each of the wheel speed sensors 26 detects, based on the rotational speed of the corresponding wheel of the own vehicle 100, the speed of the own vehicle 100. The drive assist apparatus 10 obtains travelling information of the own vehicle 100 based on the yaw rate detected by the yaw rate sensor 24 and the vehicle speed detected by the wheel speed sensors 26.

The drive assist apparatus 10 is mainly comprised of a known microcomputer equipped with a CPU 12, a ROM 14, a RAM 16, and other devices. The CPU 12 runs programs stored in the ROM 14 based on measurement results of various sensors SS, so that the drive assist apparatus 10 performs various tasks.

The drive assist apparatus 10 activates, based on the measurement results, i.e. measurement information, which are obtained from the various sensors SS, the controlled targets 30 for drive assist. The controlled targets 30 include, for example, actuators for driving, for example, the brakes, the steering, and the seatbelts, and a warning device that outputs a warning.

The drive assist apparatus 10 calculates, for each object detected by the camera sensor 20 and/or radar sensor 22, a TTC based on the relative speed of the object relative to the own vehicle 100, and the distance between the own vehicle 100 and the object.

If the object and the own vehicle 100 approach each other so that the TTC falls down to one of predetermined activation thresholds, the drive assist apparatus 10 controls, according to a type of drive assist, at least one of the controlled targets 30 corresponding to the type of drive assist for avoiding a collision between the vehicle 100 and the object or mitigating damage due to a collision. This control of the at least one of the controlled targets 30 carries out one or more drive assist tasks, such as a task of outputting a warning, a task of activating the brakes, a task of assisting the operation of the steering, and winding the seat belts.

That is, an activation threshold for the TTC determines the execution timing of the drive assist. The larger an activation threshold for the TTC is, the earlier the execution timing of the drive assist is, and the smaller an activation threshold for the TTC is, the later the execution timing of the drive assist is.

The activation thresholds for the drive assist are individually determined as TTC maps M(TCC) for the respective types of the drive assist as a function of (1) The relative approach speed of an object to the own vehicle 100

(2) The relative position of the object relative to the own vehicle 100

(3) The type of the object (4) The travelling environment around the own vehicle 100

(5) The reliabilities of the measurement results of the camera sensor 20 and the radar sensor 22.

The TTC maps M(TCC), which include the determined activation thresholds for the respective types of the drive assist are, are stored beforehand in, for example, the ROM 14 or the RAM 16.

Referring to FIG. 1, the TTC maps M(TCC) are stored in the ROM 14. The travelling environment around the own vehicle 100 represents, for example, whether the road surface is slippery due to snow on the road surface or the freeze of the road surface. One of the sensors SS is configured to measure the information about the travelling environment, and to send the information about the travelling environment to the drive assist apparatus 10.

For example, the drive assist apparatus 10 according to the first embodiment is configured to delay the execution timing of each type of the drive assist upon the reliability of object measurement being lower as compared with the execution timing of the corresponding type of the drive assist upon the reliability of object measurement being higher.

Routine

Figure 2:
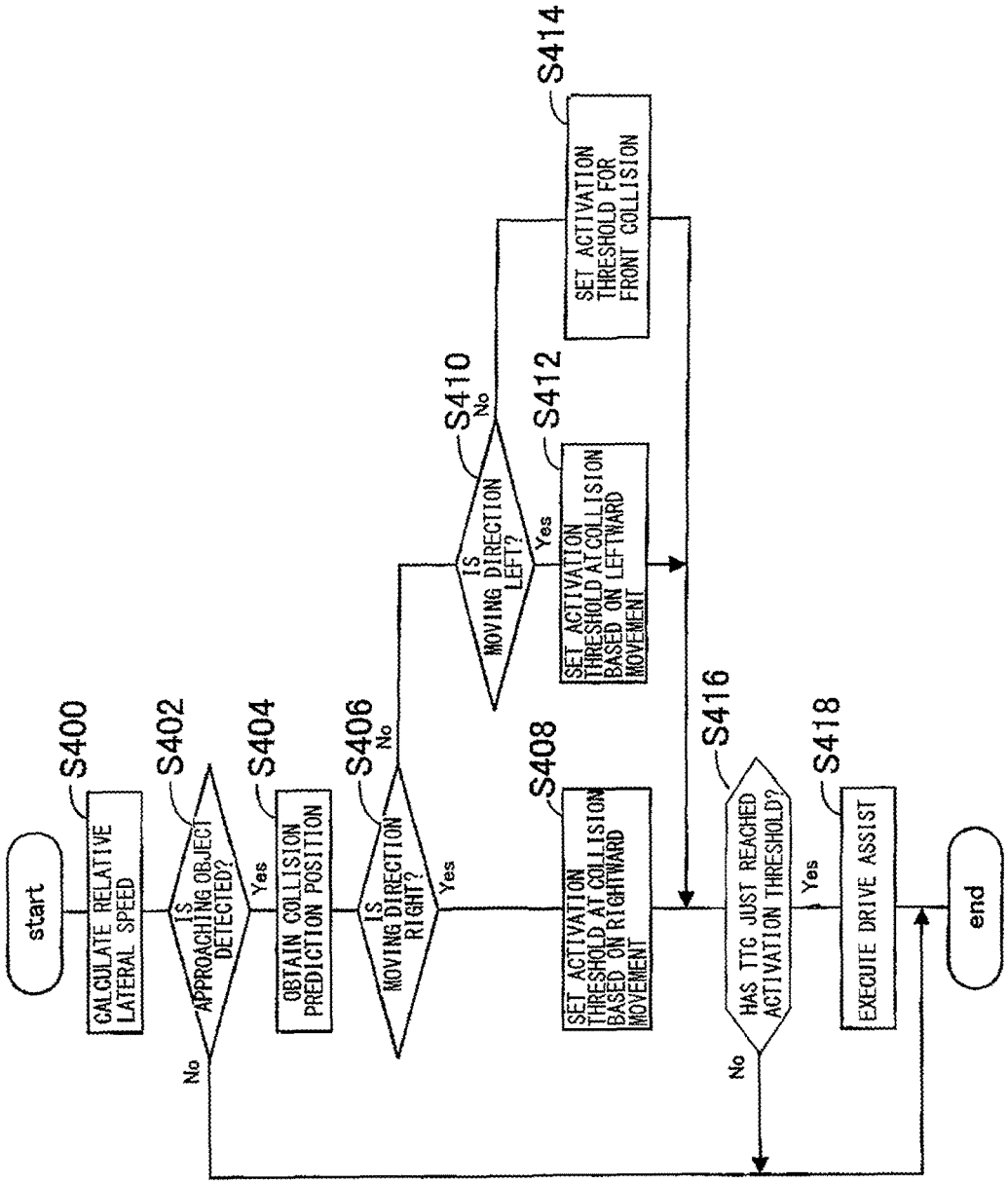
FIG. 2 is a flowchart illustrating a drive assist routine.

The following describes a drive assist routine carried out by the drive assist apparatus 10, i.e. its CPU 12, with reference to the flowchart of FIG. 2.

The flowchart illustrated in FIG. 2 shows the drive assist routine for setting the activation thresholds for drive assist. The flowchart is executed each time one scan of electromagnetic waves by the radar sensor 22 is completed.

Note that the operations in steps S400 to D418 carried out by the drive assist apparatus 10, i.e. its CPU 12 described later respectively constitute functional elements, and therefore, the operations in steps S400 to D418 can be represented as functional blocks S400 to S418 that the drive assist apparatus 10 includes.

When running the drive assist routine, the drive assist apparatus 10 detects plural objects around the own vehicle 100, especially in front of the own vehicle 100, in accordance with received signals of echoes and images captured by the camera sensor 20 in step S400; the echoes are obtained based on scanning of electromagnetic waves by the radar sensor 22. In step S400, the drive assist apparatus 10 calculates, as the relative position of each of the detected objects relative to the own vehicle 100, the distance between the own vehicle 100 and a corresponding one of the detected objects and the direction of a corresponding one of the detected objects relative to the own vehicle 100.

The drive assist apparatus 10 calculates the relative speed of at least one object that is approaching the own vehicle 100 based on change of the relative position of each object relative to the own vehicle 100 in step S400. The drive assist apparatus 10 also calculates the relative lateral speed and the relative approach speed of the at least one object as a function of the relative speed of the at least one object approaching the own vehicle 100 and the direction of the at least one object from the own vehicle 100 in step S400. The relative lateral speed of the at least one object is comprised of a component of the relative speed of the at least one object relative to the own vehicle 100 in the lateral direction corresponding to the width direction of the own vehicle 100. The relative approach speed is comprised of a component of the relative speed in the front direction of the own object 100.

Note that the operation of the drive assist apparatus 10 in step S400 corresponds to, for example, object detection means.

The drive assist apparatus 10 serves as, for example, a position prediction unit to determine whether the detected at least one object, which will be referred to as a target object, is approaching the own vehicle 100 in step S402.

In step S404, the drive assist apparatus 10 serves as, for example, the position prediction unit upon determining that the target object is approaching the own vehicle 100 (YES in step S402) to (1) Calculate the TTC of the target object to the own vehicle 100 as a function of the distance and relative speed of the target object relative to the own vehicle 100

Figure 3:
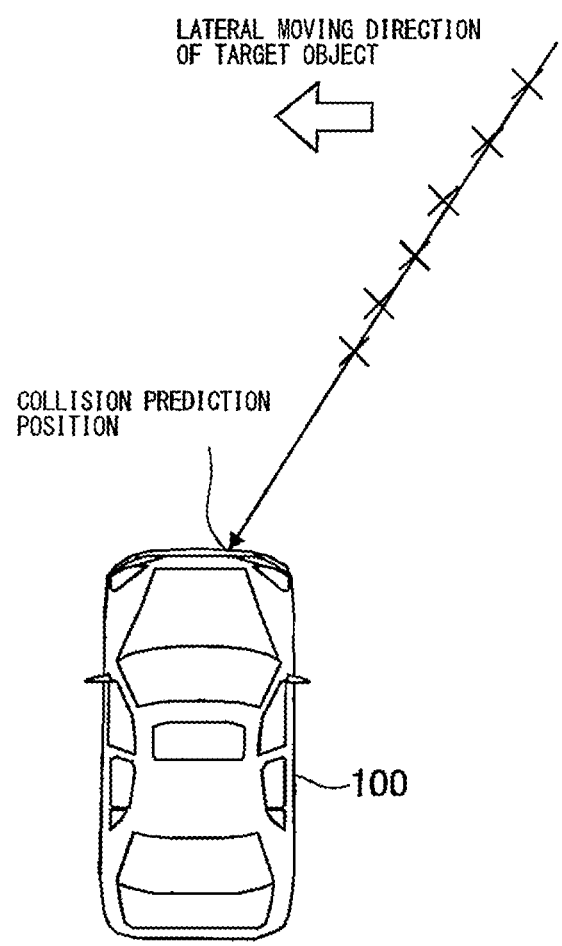
FIG. 3 is a schematic view illustrating how a collision position between an object and an own vehicle will collide with each other.

(2) Predict the position, which will be referred to as a movement prediction position, to which the target object will move in accordance with the trajectory of the relative speed of the target object (see FIG. 3).

In step S404, the drive assist apparatus 10 obtains the movement prediction position as a collision prediction position upon determining that, if the target object relatively moves to the movement prediction position, there is a possibility that the target object will collide with the own vehicle 100.

Following the operation in step S404, the drive assist apparatus 10 determines whether the direction of the relative lateral movement of the target vehicle is the rightward direction or the leftward direction from the driver of the own vehicle 100 in step S406.

Upon determining that the direction of the relative lateral movement of the target vehicle is the rightward direction relative to the driver of the own vehicle 100 (YES in step S406), the drive assist apparatus 10 serves as, for example, a determination unit to determine the activation threshold if the target object relatively moves in the rightward direction to collide with the front of the own vehicle 100 in its travelling direction in step S408.

For example, in step S408, the drive assist apparatus 10 determines the type of the drive assist tasks in accordance with, for example, the relative approach speed of the target object, the relative position of the target object, the type of the target object, the travelling environment around the own vehicle 100, and the reliabilities of the measurement results of the target object by the camera sensor 20 and the radar sensor 22. Then, in step S408, the drive assist apparatus 10 reads, from the TTC map M(TTC) corresponding to the determined drive assist task, a value of the activation threshold; the value of the activation threshold matches with the calculated TTC.

Then, in step S408, the drive assist apparatus 10 determines a final value of the activation threshold based on the readout value of the activation threshold, the relative lateral moving direction, i.e. rightward direction, of the target object relatively approaching the own vehicle 100, and the collision prediction position. The task of determining the activation threshold will be described in detail later.

Otherwise, upon determining that the direction of the relative lateral movement of the target vehicle is the leftward direction relative to the driver of the own vehicle 100 (NO in step S406), the drive assist apparatus 10 determines whether the direction of the relative lateral movement of the target vehicle is the leftward direction or the leftward direction from the driver of the own vehicle 100 in step S410.

Upon determining that the direction of the relative lateral movement of the target vehicle is the leftward direction from the driver of the own vehicle 100 (YES in step S410), the drive assist apparatus 10 serves as, for example, the setting unit to set the activation threshold if the target object relatively moves in the leftward direction to collide with the front of the own vehicle 100 in its travelling direction in step S412.

For example, in step S412, the drive assist apparatus 10 determines the type of the drive assist tasks in accordance with, for example, the relative approach speed of the target object, the relative position of the target object, the type of the target object, the travelling environment around the own vehicle 100, and the reliabilities of the measurement results of the target object by the camera sensor 20 and the radar sensor 22. Then, in step S412, the drive assist apparatus 10 reads, from the TTC map M(TTC) corresponding to the determined drive assist task, a value of the activation threshold; the value of the activation threshold matches with the calculated TTC.

Then, in step S412, the drive assist apparatus 10 determines a final value of the activation threshold based on the readout value of the activation threshold, the relative lateral moving direction, i.e. leftward direction, of the target object relatively approaching the own vehicle 100, and the collision prediction position. The task of determining the activation threshold will be described in detail later.

Additionally, upon determining that the direction of the relative lateral movement of the target vehicle is neither the rightward direction nor the leftward direction from the driver of the own vehicle 100 (NO in step S406), the drive assist apparatus 10 determines that the target object is relatively moving to the own vehicle 100 in its front direction. Then, the drive assist apparatus 10 serves as, for example, the setting unit to set the activation threshold if the target object relatively moves from the front direction of the own vehicle 100 to collide with the own vehicle 100 in step S414.

For example, in step S414, the drive assist apparatus 10 determines the type of the drive assist tasks in accordance with, for example, the relative approach speed of the target object, the relative position of the target object, the type of the target object, the travelling environment around the own vehicle 100, and the reliabilities of the measurement results of the target object by the camera sensor 20 and the radar sensor 22. Then, in step S414, the drive assist apparatus 10 reads, from the TTC map M(TTC) corresponding to the determined drive assist task, a value of the activation threshold; the value of the activation threshold matches with the calculated TTC.

Then, in step S414, the drive assist apparatus 10 determines a final value of the activation threshold based on the readout value of the activation threshold, the relative lateral moving direction, i.e. front direction, of the target object relatively approaching the own vehicle 100, and the collision prediction position. The task of determining the activation threshold will be described in detail later.

The drive assist apparatus 10, which has completed the operation in step S408, S412, or S414, determines whether the TTC is reaching the final value of the activation threshold determined in any one of the operations in steps S408, S412, and S414 in step S416.

Upon determining that the TTC has just reached the final value of the activation threshold determined in any one of the operations in steps S408, S412, and S414 (YES in step S416), the drive assist apparatus 10 serves as, for example, a drive assist unit to control at least one of the controlled targets 30, which is required to perform the determine type of the drive assist tasks, thus performing the determined type of the drive assist tasks in step S418.

Activation Threshold Deter Mining (Steps S408, S412, S414)

The following describes how the drive assist apparatus 10 determines the activation threshold in each of steps S408, S412, and S414.

Movement of Target Object in Rightward Direction

Figure 4:
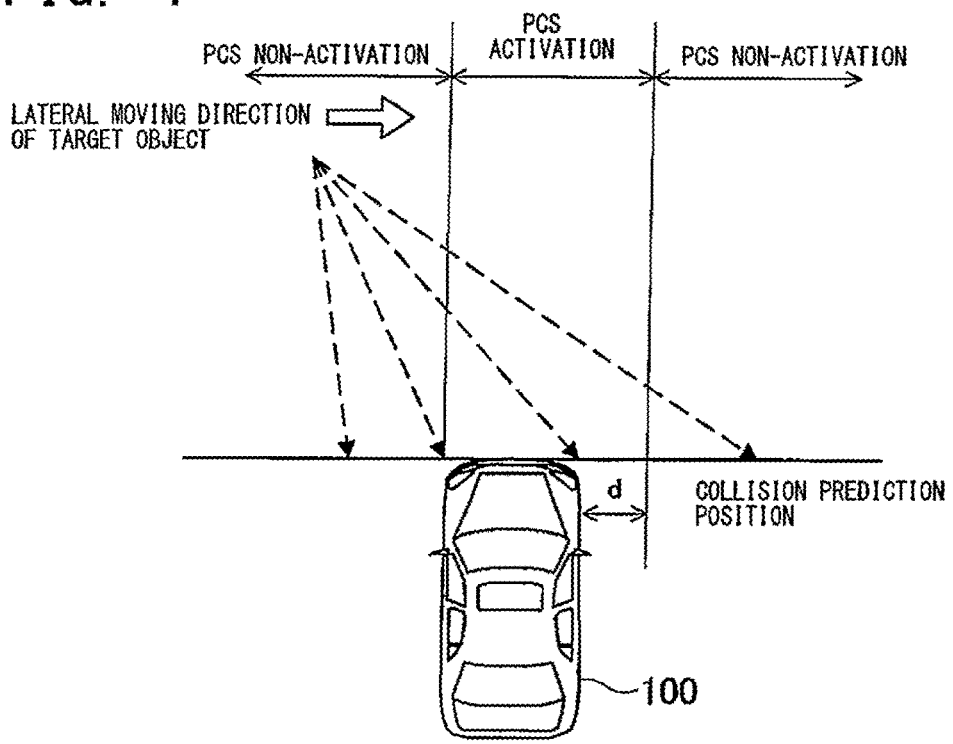
FIG. 4 is a schematic view illustrating the relative moving direction of the object, and the range within which drive assist is carried out.

Referring to FIG. 4, if the relative lateral moving direction of the target object is the rightward direction, and the target object is approaching the own vehicle 100 toward the far-side corner of the front end, i.e. the right front end, of the own vehicle 100, the target vehicle is approaching the own vehicle 100 while passing through the front side of the own vehicle 100 in its travelling direction.

In contrast, if the relative lateral moving direction of the target object is the rightward direction, and the target object is approaching the own vehicle 100 toward the near-side corner of the front end, i.e. the left front end, of the own vehicle 100, the target vehicle is approaching the own vehicle 100 from the position deviated from the front side of the own vehicle 100 in its travelling direction.

If the relative lateral moving direction of the target object is the rightward direction, the first case where the target object is approaching the own vehicle 100 toward the far-side corner of the front end, i.e. the right front end, of the own vehicle 100 has a higher probability of colliding with the own vehicle 100 than the second case where the target object is approaching the own vehicle 100 toward the near-side corner of the front end, i.e. the left front end, of the own vehicle 100.

Figure 5:
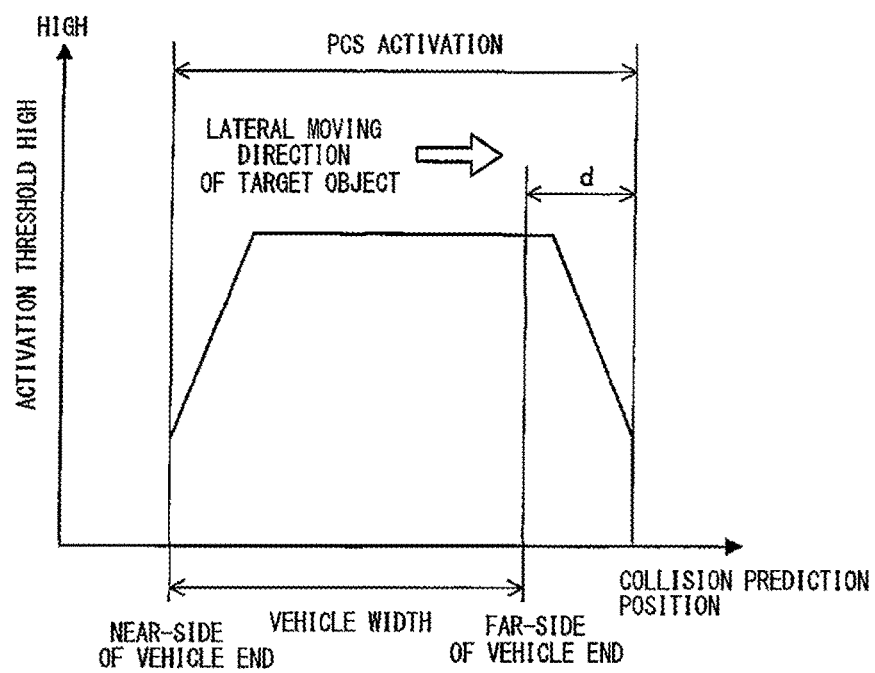
FIG. 5 is a characteristic graph illustrating the relationship between the collision prediction position and the activation threshold for the drive assist.

If the relative lateral moving direction of the target object is the rightward direction, the drive assist apparatus 10 according to the first embodiment therefore determines that a value of the activation threshold in the first case where the target object is approaching the own vehicle 100 toward the far-side corner of the front end, i.e. the right front end, of the own vehicle 100 is greater than a value of the activation threshold in the second case where the target object is approaching the own vehicle 100 toward the near-side corner of the front end, i.e. the left front end, of the own vehicle 100 (see FIG. 5). Note that a map illustrated in FIG. 5 is stored in, for example, the ROM 14 or RAM 16 while having a format readable by the CPU 12 of the drive assist apparatus 10.

If the relative lateral moving direction of the target object is the rightward direction, this results in the execution timing of the drive assist in the first case where the collision prediction position is located at the far-side of the end of the own vehicle 100 in the moving direction of the target object being earlier than the execution timing of the drive assist in the second case where the collision prediction position is located at the near-side of the end of the own vehicle 100 in the moving direction of the target object.

In the case where the relative lateral moving direction of the target object is the rightward direction, and the target object is approaching the own vehicle 100 toward the outside of the far-side corner of the own vehicle 100, the target object will not collide with the own vehicle 100 if the target object moves toward the outside of the far-side corner of the front end of the own vehicle 100 without any change.

However, if the absolute velocity of the target object and/or the own vehicle 100 changes, or the absolute moving direction of the target object and/or the own vehicle 100 changes, so that the relative speed and/or the relative moving direction of the target object relative to the own vehicle 100 changes, there will be a possibility of the target object colliding with the own vehicle 100.

In contrast, in the case where the relative lateral moving direction of the target object is the rightward direction, and the target object is approaching the own vehicle 100 toward the outside of the near-side edge of the own vehicle 100, the target object will unlikely collide with the own vehicle 100 even if the absolute velocity of the target object and/or the own vehicle 100 changes, or the absolute moving direction of the target object and/or the own vehicle 100 changes, so that the relative speed and/or the relative moving direction of the target object relative to the own vehicle 100 changes.

Accordingly, as illustrated in FIGS. 4 and 5, in the case where the relative lateral moving direction of the target object is the rightward direction, the range where the activation threshold should be set is expanded as an expanded range (d) to cover the outside of the far-side edge of the own vehicle 100 in the moving direction of the target object. This enables, in the case where the relative lateral moving direction of the target object is the rightward direction, drive assist to be carried out even if the collision prediction position is located outside of the far-side edge of the own vehicle 100 in the moving direction of the target object.

As illustrated in FIG. 5, in the case where the relative lateral moving direction of the target object is the rightward direction, the activation threshold gradually increases from the near-side front end of the own vehicle 100 to the center portion, i.e. the center portion of the front end of the own vehicle 100, keeps constant from the center of the front end of the own vehicle 100 to a portion that has passed through the far-side edge of the front end of the own vehicle 100, and thereafter gradually decreases toward the end edge of the expanded range (d). That is, a value of the activation threshold when the center of the front end of the own vehicle 100 is the collision prediction position is greater than a value of the activation threshold when the collision prediction position is located at one of the lateral edges of the front end of the own vehicle 100, to which the activation threshold is set, in its travelling direction.

Movement of Target Object in Leftward Direction

Like the relative lateral moving direction of the target object being the rightward direction, if the relative lateral moving direction of the target object is the leftward direction, the first case where the target object is approaching the own vehicle 100 toward the far-side corner of the front end, i.e. the left front end, of the own vehicle 100 has a higher probability of colliding with the own vehicle 100 than the second case where the target object is approaching the own vehicle 100 toward the near-side corner of the front end, i.e. the right front end, of the own vehicle 100.

Figure 7:
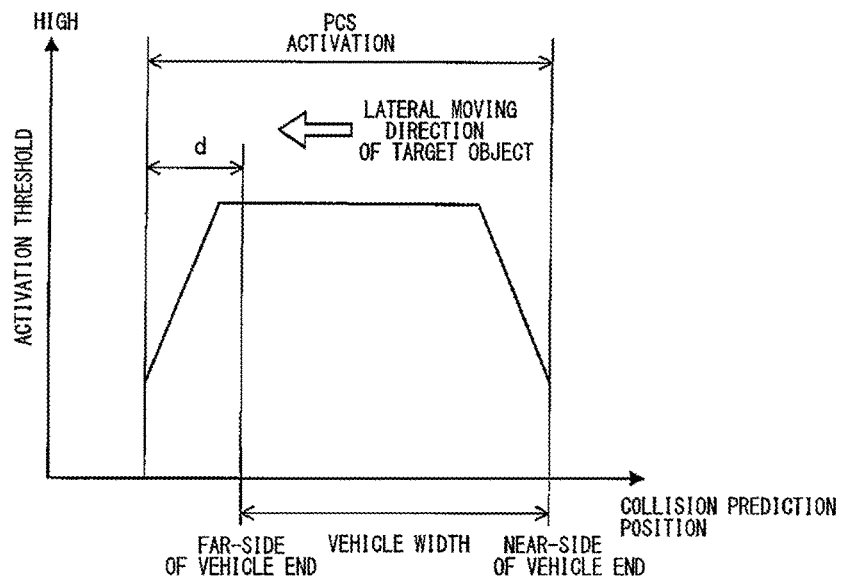
FIG. 7 is another characteristic graph illustrating the relationship between the collision prediction position and the activation threshold for the drive assist.

If the relative lateral moving direction of the target object is the leftward direction, the drive assist apparatus 10 according to the first embodiment therefore determines that a value of the activation threshold in the first case where the target object is approaching the own vehicle 100 toward the far-side corner of the front end of the own vehicle 100 is greater than a value of the activation threshold in the second case where the target object is approaching the own vehicle 100 toward the near-side corner of the front end of the own vehicle 100 (see FIG. 7). Note that a map illustrated in FIG. 5 is stored in, for example, the ROM 14 or RAM 16 while having a format readable by the CPU 12 of the drive assist apparatus 10.

If the relative lateral moving direction of the target object is the leftward direction, this results in the execution timing of the drive assist in the first case where the collision prediction position is located at the far-side of the end of the own vehicle 100 in the moving direction of the target object being earlier than the execution timing of the drive assist in the second case where the collision prediction position is located at the near-side of the end of the own vehicle 100 in the moving direction of the target object.

Figure 6:
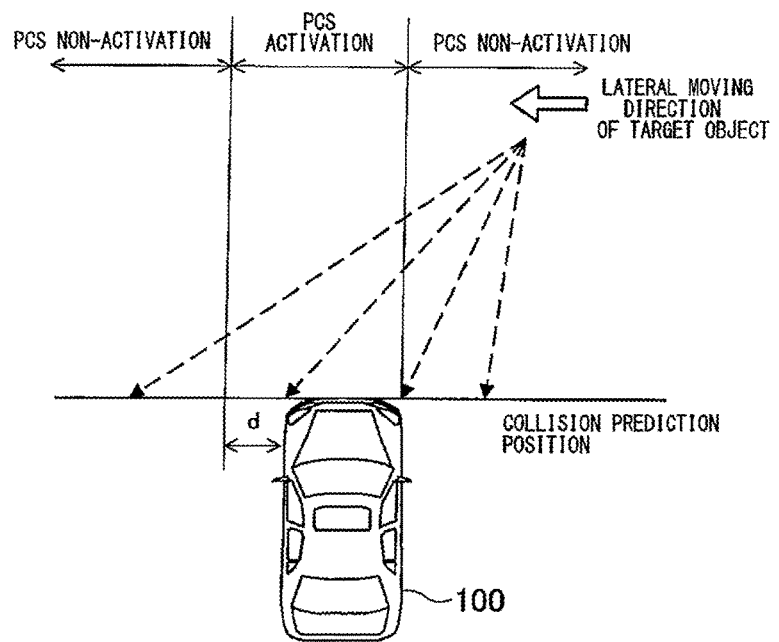
FIG. 6 is another schematic view illustrating the relative moving direction of the object, and the range within which drive assist is carried out.

As illustrated in FIGS. 6 and 7, in the case where the relative lateral moving direction of the target object is the leftward direction, the range where the activation threshold should be set is expanded as an expanded range (d) to cover the outside of the far-side edge of the own vehicle 100 in the moving direction of the target object. This enables, in the case where the relative lateral moving direction of the target object is the leftward direction, drive assist to be carried out even if the collision prediction position is located outside of the far-side edge of the own vehicle 100 in the moving direction of the target object.

As illustrated in FIG. 7, in the case where the relative lateral moving direction of the target object is the leftward direction, the activation threshold gradually increases from the near-side of the front end of the own vehicle 100 to the center portion, i.e. the center portion of the front end of the own vehicle 100, keeps constant from the center of the front end of the own vehicle 100 to a portion that has passed through the far-side of the front end of the own vehicle 100, and thereafter gradually decreases toward the end edge of the expanded range (d). That is, a value of the activation threshold when the center of the front end of the own vehicle 100 is the collision prediction position is greater than a value of the activation threshold when the collision prediction position is located at one of the lateral edges of the front end of the own vehicle 100, to which the activation threshold is set, in its travelling direction.

Movement of Target Object in Longitudinal Direction

The following describes a case where the target object is approaching the own vehicle 100 in the longitudinal direction of the own vehicle 100. In this case, as compared with the approaching direction is the rightward direction or leftward direction described above, there is little deviation between (1) The probability of the target object colliding with the own vehicle 100 at a collision prediction position (2) The probability of the target object colliding with the own vehicle 100 at another collision prediction position.

This results in the activation threshold for drive assist being set to the common value independently of the collision prediction positions.

Figure 8:
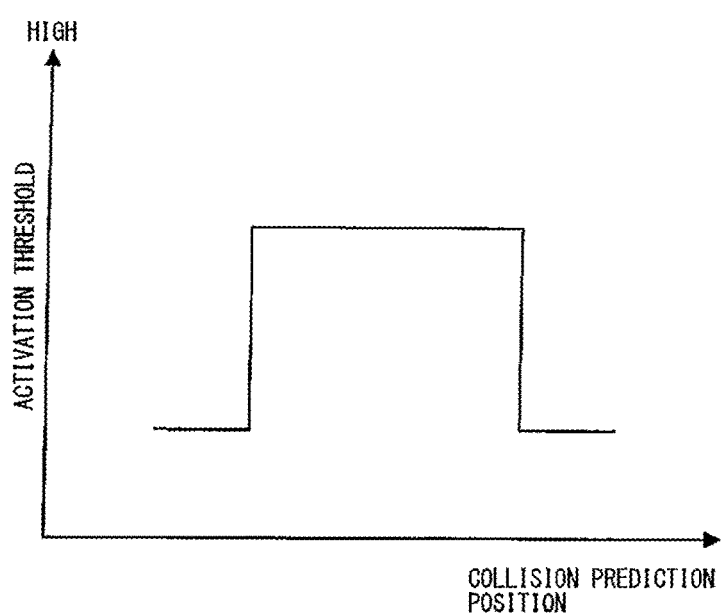
FIG. 8 is a further characteristic graph illustrating the relationship between the collision prediction position and the activation threshold for the drive assist.

The relationship between the collision prediction position and the activation threshold if the target object is moving in each of the right and leftward directions relative to the own vehicle 100 so as to approach the own vehicle 100 is not expressed as the configuration illustrated in a corresponding one of FIGS. 5 and 7, but as a stepped configuration illustrated in FIG. 8. The map illustrated in FIG. 8 is stored in, for example, the ROM 14 or RAM 16 while having a format readable by the CPU 12 of the drive assist apparatus 10.

Figure 9:
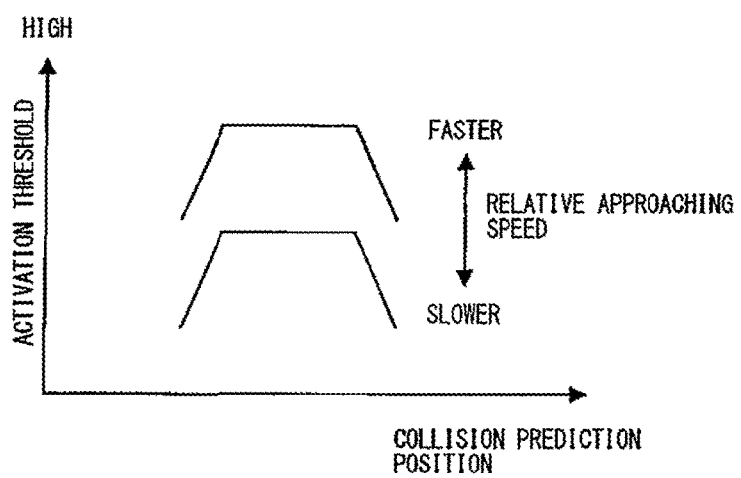
FIG. 9 is a characteristic graph illustrating the relationship between the collision prediction position and the activation threshold for the drive assist depending on the relative approach speed between the object and the own vehicle.

The faster the relative approach speed of the target object that is approaching the own vehicle 100 in the face-to-face direction is, the greater the damage caused by a collision between the target object and the own vehicle 100 will be. Thus, as illustrated in FIG. 9, the drive assist apparatus 10 can be configured such that, the faster the relative approach speed of the target object relative to the own vehicle 100 is, the greater the activation threshold is independently of the collision prediction position. Similarly, the drive assist apparatus 10 can be configured such that, the higher the yaw rate of the own vehicle 100 is, the greater the activation threshold is independently of the collision prediction position. Note that the map illustrated in FIG. 9 is stored in, for example, the ROM 14 or RAM 16 while having a format readable by the CPU 12 of the drive assist apparatus 10.

In a case where the target object is approaching the own vehicle 100 toward the outside of the far-side edge of the own vehicle 100, the faster the relative lateral speed of the target vehicle is, the higher the probability of the target object colliding with the own vehicle 100 due to change of the relative speed or the relative moving direction of the target object relative to the own vehicle 100 is. Thus, the faster the relative lateral speed of the target object is, the wider the expanded range of the activation threshold, which covers the outside of the far-side edge of the own vehicle 100 in the moving direction of the target object, can be.

Advantageous Effect

The above described first embodiment achieves the following advantageous effects.

The drive assist apparatus 10 according to the first embodiment determines the activation threshold for drive assist as a function of the lateral moving direction of a target object relatively approaching the own vehicle 100 and a collision prediction position. This configuration achieves the first advantageous effect that enables drive assist to be carried out at an execution timing being properly determined depending on the collision probability at the collision prediction position.

The drive assist apparatus 10 is configured to, when the target object is relatively approaching the own vehicle 100, expand the determined range of the activation threshold to the outside of the far-side edge of the front end of the own vehicle 100 in the moving direction of the target object. This configuration enables, even if the target object will collide with the own vehicle 100 outside the width of the own vehicle 100, drive assist to be carried out based on the activation threshold.

Second Embodiment

Structure

The drive assist apparatus 10 according to the second embodiment is configured to determine, as a function of a collision probability between a target object and the own vehicle 100, the activation threshold if the target object will collide with one side of the own vehicle 100.

Figure 10:
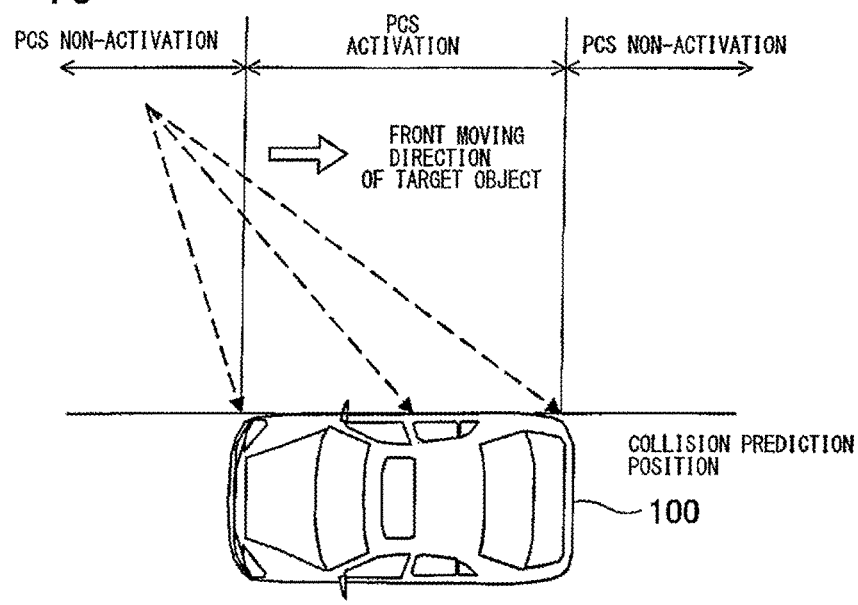
FIG. 10 is a schematic view illustrating the relative moving direction of the object, and the range within which drive assist is carried out according to the second embodiment.

Referring to FIG. 10, if the target object is relatively moving from the front direction of the own vehicle 100 to approach the own vehicle 100, so the collision prediction position is located at the right side or left side of the own vehicle 100, the collision probability between the target object and the own vehicle 100 is likely to be higher at the front end of the own vehicle 100 in its travelling direction than the collision probability between the target object and the own vehicle 100 at the rear end of the own vehicle 100 in its traveling direction.

Figure 11:
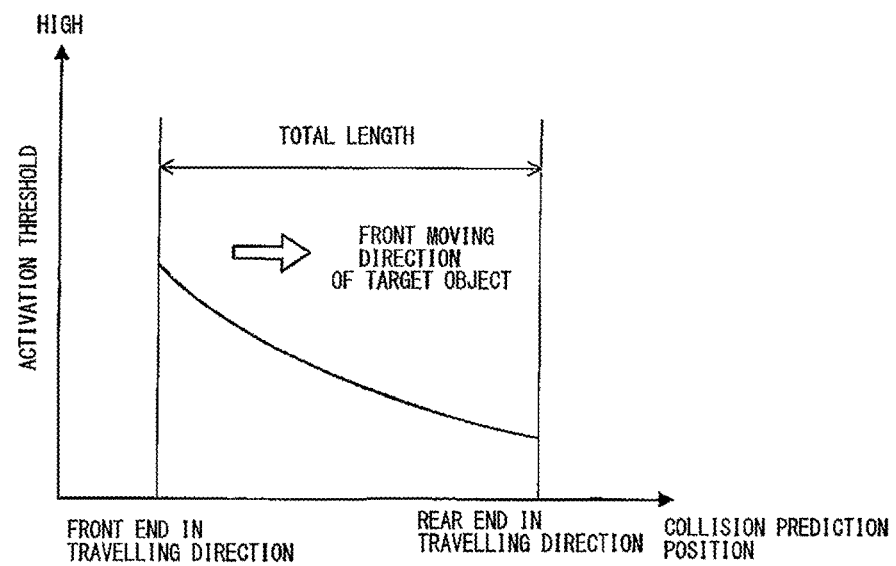
FIG. 11 is a characteristic graph illustrating the relationship between the collision prediction position and the activation threshold for the drive assist.

Accordingly, referring to FIG. 11, the drive assist apparatus 10 is configured to determine the activation threshold such that the activation threshold increases as the collision prediction position changes from the rear end of the own vehicle 100 to the front end of the own vehicle 100 in the travelling direction. This configuration enables the activation timing of drive assist at the front end of the own vehicle 100 in the travelling direction to be earlier than the activation timing of drive assist at the rear end of the own vehicle 100 in the travelling direction. Note that a map illustrated in FIG. 11 is stored in, for example, the ROM 14 or RAM 16 while having a format readable by the CPU 12 of the drive assist apparatus 10.

Note that descriptions of the other configuration will be omitted, because the other configuration is identical to the corresponding configuration of the drive assist apparatus 10 according to the first embodiment.

Advantageous Effect

Even if the collision prediction position between the target object and the own vehicle 100 is located at one side of the own vehicle 100, the drive assist apparatus 10 according to the second embodiment is configured to determine the activation threshold as a function of the moving direction of the target object relatively approaching the own vehicle 100 and the collision prediction position. This configuration enables drive assist to be carried out at a proper timing determined based on a collision probability at the collision prediction position.

Other Embodiments

The drive assist apparatus 10 according to each of the first and second embodiments includes the TTC maps M(TTC) for the respective types of drive assist. The TTC maps M(TTC) can also be provided for the destinations of the drive assist apparatus 10 to be used, such as regions or countries of the drive assist apparatus 10 to be used. The TTC maps M(TTC) can further be provided for the types or sizes of vehicles in which the drive assist apparatus 10 is to be installed. This enables the drive assist apparatus 10 to accept at least one of a specified destination of the drive assist apparatus 10 and specified type and size of the vehicle in which the drive assist apparatus 10 is to be installed, and to select at least one of the TTC maps M(TTC), which matches with the at least one of the specified destination of the drive assist apparatus 10 and the specified type and size of the vehicle in which the drive assist apparatus 10 is to be installed.

This enables an aspect of the drive assist apparatus 10 to carry out drive assist at a proper timing determined based on the destination of the drive assist apparatus 10 and/or the type of the vehicle in which the drive assist apparatus 10 is to be installed.

For example, the drive assist apparatus 10 according to the first embodiment is configured to determine the activation threshold as a function of the information illustrated in FIGS. 4 to 9 in a case where the travelling direction of the own vehicle 100 is the forward travel direction, but the present invention is not limited to the configuration. Specifically, the drive assist apparatus 10 can be configured to determine, if the own vehicle 100 is travelling in the rearward direction, the activation threshold based on the collision probability at the collision prediction position between the target object and the own vehicle 100 using the information illustrated in FIGS. 4 to 9 as long as the rearward direction is regarded as the travelling direction of the own vehicle 100. The drive assist apparatus 10 according to the second embodiment can also be configured to determine, if the own vehicle 100 is travelling in the rearward direction, the activation threshold based on the collision probability at the collision prediction position between the target object and the own vehicle 100 using the information illustrated in FIGS. 10 and 11 as long as the rearward direction is regarded as the travelling direction of the own vehicle 100.

The functions of one element in each of the first and second embodiments can be distributed as plural elements, and the functions that plural elements have can be combined into one element. At least part of the structure of each of the first and second embodiments can be replaced with a known structure having the same function as the at least part of the structure of the corresponding embodiment. A part of the structure of each of the first and second embodiments can be eliminated. At least part of the structure of each of the first and second embodiments can be added to or replaced with the structures of the other embodiment. All aspects included in the technological ideas specified by the language employed by the claims constitute embodiments of the present invention.

The present invention can be implemented by various embodiments in addition to the drive assist apparatuses; the various embodiments include drive assist systems each including one of the above drive assist apparatuses, programs for serving a computer as each of the drive assist apparatuses, storage media storing the programs, and drive assist methods.

| Reference Sins List | |
| --- | --- |
| 2: PCS (drive assist system) | 10: Drive assist apparatus |
| 20: Camera sensor | 22: Radar sensor |
| 24: Yaw rate sensor | 26: Wheel speed sensor |
| 30: Controlled target | 100: Own vehicle |

The invention claimed is:

1. A drive assist apparatus comprising:
an object detection means for detecting an object around an own vehicle;
a moving direction detection means for detecting a moving direction of the object detected by the object detection means when the object is approaching relative to the own vehicle;
a position prediction means for predicting a movement prediction position to which the object detected by the object detection means will move;
a drive assist means for executing drive assist upon the movement prediction position predicted by the position prediction means being a collision prediction position, the collision prediction position being a position where, if the object relatively moves to the movement prediction position, there is a possibility that the object will collide with the own vehicle,
the drive assist including at least one of:
a task of avoiding a collision between the object and the own vehicle; and
a task of mitigating a damage due to the collision; and
a determination means for determining an execution timing of the drive assist by the drive assist means as a function of:
the moving direction detected by the moving direction detection means; and
the collision prediction position, wherein,
upon the collision prediction position being located at a front of the own vehicle in the travelling direction, the determination means is configured to make the execution timing at which the collision prediction position is located at a far-side of the front end of the own vehicle in the moving direction earlier than the execution timing at which the collision prediction position is located at a near-side of the front end of the own vehicle in the moving direction.

2. The drive assist apparatus according to claim 1, wherein, upon the collision prediction position being located at a front of the own vehicle in the travelling direction, the determination means is configured to:
make the execution timing earlier if the collision prediction position is located at a center portion of the front end of the own vehicle in the moving direction than if the execution timing at which the collision prediction position is located at at least one lateral edge of the front end of the own vehicle in the moving direction.

3. The drive assist apparatus according to claim 1, wherein, upon the collision prediction position being located at a front of the own vehicle in the travelling direction, the determination means is configured to expand a range of the determined execution timing to cover an outside of a far-side of the front end of the own vehicle in the moving direction.

4. The drive assist apparatus according to claim 1, wherein, when the object is relatively approaching one side of the own vehicle from a front of the own vehicle in the travelling direction, and the collision prediction position is located at a right side or a left side of the own vehicle, the determination means is configured to make the execution timing earlier for a case where the collision prediction position is located at a front end of the right side or left side of the own vehicle in the traveling direction than the execution timing for a case where the collision prediction position is located at a rear end of the right side or left side of the own vehicle in the travelling direction.

5. The drive assist apparatus according to claim 1, wherein, the determination means is configured such that, the faster a relative approach speed of the object that is approaching in a face-to-face direction between the object and the own vehicle is, the earlier the execution timing is.

6. A drive assist apparatus comprising:
an object detection means for detecting an object around an own vehicle;
a moving direction detection means for detecting a moving direction of the object detected by the object detection means when the object is approaching relative to the own vehicle;
a position prediction means for predicting a movement prediction position to which the object detected by the object detection means will move;
a drive assist means for executing drive assist upon the movement prediction position predicted by the position prediction means being a collision prediction position, the collision prediction position being a position where, if the object relatively moves to the movement prediction position, there is a possibility that the object will collide with the own vehicle,
the drive assist including at least one of:
a task of avoiding a collision between the object and the own vehicle; and
a task of mitigating a damage due to the collision; and
a determination means for determining an execution timing of the drive assist by the drive assist means as a function of:
the moving direction detected by the moving direction detection means; and
the collision prediction position,
wherein, upon the collision prediction position being located at a front of the own vehicle in the travelling direction, the determination means is configured to expand a range of the determined execution timing to cover an outside of a far-side of the front end of the own vehicle in the moving direction, and wherein, the determination means is configured such that, the faster a relative lateral speed of the object that is laterally approaching the own vehicle is, the wider the range of the determined execution timing to cover the outside of the far-side of the front end of the own vehicle in the moving direction.

7. The drive assist apparatus according to claim 6, wherein, when the object is relatively approaching one side of the own vehicle from a front of the own vehicle in the travelling direction, and the collision prediction position is located at a right side or a left side of the own vehicle, the determination means is configured to make the execution timing earlier for a case where the collision prediction position is located at a front end of the right side or left side of the own vehicle in the traveling direction than the execution timing for a case where the collision prediction position is located at a rear end of the right side or left side of the own vehicle in the travelling direction.

8. The drive assist apparatus according to claim 6, wherein, the determination means is configured such that, the faster a relative approach speed of the object that is approaching in a face-to-face direction between the object and the own vehicle is, the earlier the execution timing is.

9. A method for providing drive assist to an own vehicle, the method comprising:
   detecting an object around the own vehicle;
   detecting a moving direction of the object detected when the object is approaching relative to the own vehicle;
   predicting a movement prediction position to which the object detected will move; and
   executing drive assist upon the movement prediction position predicted being a collision prediction position, the collision prediction position being a position where, if the object relatively moves to the movement prediction position, there is a possibility that the object will collide with the own vehicle,
   the drive assist including at least one of:
      avoiding a collision between the object and the own vehicle; and
      mitigating a damage due to the collision; and
      determining an execution timing of the drive assist as a function of:
         the moving direction detected; and
         the collision prediction position,
   wherein, upon the collision prediction position being located at a front of the own vehicle in the travelling direction, setting the execution timing at which the collision prediction position is located at a far-side of the front end of the own vehicle in the moving direction to be earlier than the execution timing at which the collision prediction position is located at a near-side of the front end of the own vehicle in the moving direction.

10. The method according to claim 9, wherein, when the object is relatively approaching one side of the own vehicle from a front of the own vehicle in the travelling direction, and the collision prediction position is located at a right side or a left side of the own vehicle, the execution timing is made earlier for a case where the collision prediction position is located at a front end of the right side or left side of the own vehicle in the traveling direction than the execution timing for a case where the collision prediction position is located at a rear end of the right side or left side of the own vehicle in the travelling direction.

11. The method according to claim 9, wherein, the faster a relative approach speed of the object that is approaching in a face-to-face direction between the object and the own vehicle is, the earlier the execution timing is.

* * * * *